April 11, 1950     A. C. BUSSEY     2,503,998
PICKUP TOOL
Filed July 24, 1948
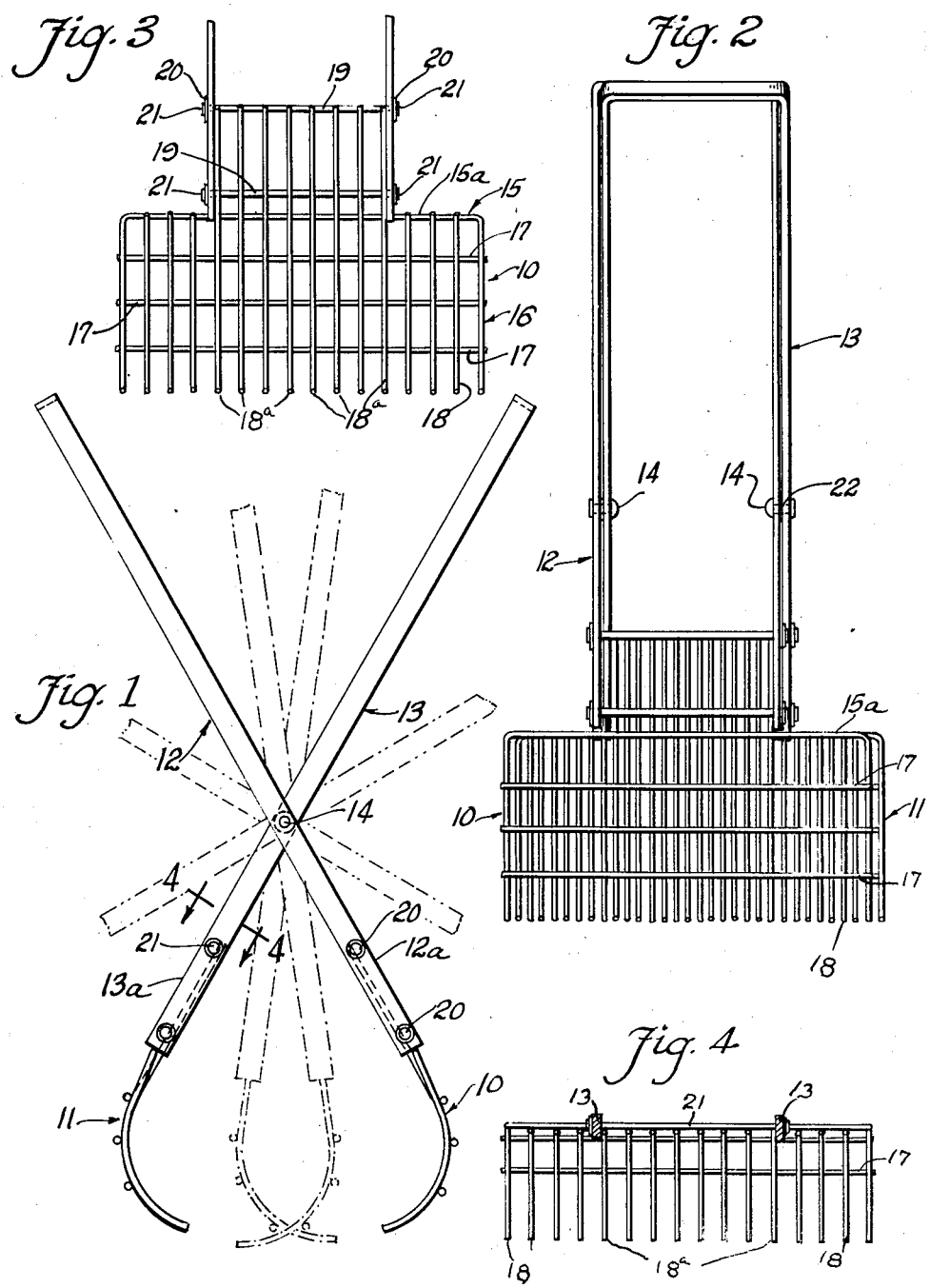
INVENTOR.
Allan C. Bussey
BY
Sheridan, Davis & Cargill
Attorneys Patented Apr. 11, 1950

2,503,998

UNITED STATES PATENT OFFICE 2,503,998

PICKUP TOOL

Allan C. Bussey, Chicago, Ill.

Application July 24, 1948, Serial No. 40,499

4 Claims. (Cl. 294—50.8)

This invention relates to improvements in pickup tools.

One object of the invention is to provide an improved device for picking up trash, such as leaves, weeds, twigs or the like that have been raked or otherwise gathered into a pile or piles. Thus, the device is useful for garden and lawn use, for picking up refuse along curbs and at other locations.

Another object of the invention is to provide a pick-up device or tool for manual use that enables the user readily to gather up trash, such as leaves, weeds, twigs or the like in substantial quantities at each operation of the tool, and to grasp the gathered material firmly to avoid loss or the scattering thereof while loading the same in a wheelbarrow, basket or other vehicle or receptacle for example.

An additional object of the invention is to provide a pick-up tool that requires but little, if any, stooping by the user during use of the device, and which can be stood in an upright position during intervals of non-use as a further convenience.

A further object of the invention is to provide a device of the character described that is easily manipulatable, that is, sturdy in construction and is adapted firmly to grasp and hold variable quantities of the materials being gathered.

Further objects of the invention relate to features of construction of the two cooperating identical heads of the device and to their assembly upon the operating arms or handles, whereby the tines of the heads are positioned for mutual interleaving relationship when the tool is moved to a fully or approximately to a fully closed position.

In the accompanying drawings, wherein a pickup tool that is illustrative of the invention is shown, Figure 1 is a side elevation of the tool, various operative positions thereof being suggested by dotted lines;

Fig. 2 is a front elevational view of the tool in fully closed position;

Fig. 3 is an elevational view of one head only of the tool, the connected handle being broken away; and Fig. 4 is a sectional view taken on line 4—4 of Fig. 1.

In the drawings the form of the tool selected for illustrating the invention comprises a pair of fabricated heads 10 and 11 attached to handles 12 and 13, respectively, which are pivotally connected to provide a tong-like device that is manually operable for picking up various substances or materials such as were referred to above. The pivotal connection, in the form of the tool shown, consists of axially aligned rivets or pins 14.

By reason of the assembly of the two fork-like halves of which the tool is composed, the heads 10 and 11, as well as the handles 12 and 13, can be made respectively identical, thereby simplifying the manufacture of the parts. Since the heads shown are identical, only one will be described in detail.

As shown in Fig. 3, the head 10 is formed of wire, of appropriate gauge, such as No. 9 or 10 for example, and is provided with a U-shaped portion 15 having a horizontal portion 15a extending transversely of the integral arms 16. There are shown three cross members 17 which are welded at the ends to the arms 16. The arms 16 are curved, as illustrated in Fig. 1, and constitute the end tines of the head. Extending parallel with the legs are a plurality of tine members 18 curved similarly to the arms or end tines 16 and welded at the upper ends to the horizontal section 15a of the member 15 as well as at the points of intersection with the cross members 17. It will be noted in Fig. 3 that the tines are arranged in three banks or groups, the two end banks each consisting of three tine members 18 while the central bank consists of eight tine members 18a which extend upwardly beyond the horizontal portion 15a and are secured, as by welding at the points of intersection thereof with two transverse tine members 19. These upper sections of the tine members 18a are shown as straight. In fact the portions of all the tines above the upper transverse tie rod 17 preferably are straight, the curves of the tines, in the particular form of the heads illustrated, being confined to the portions of the lines below the upper cross member 17.

The assembly of the heads described can be effected by use of simple jig means for holding the several parts of the heads in position during welding of the points of intersection of the several parts. The tines can be bent after fabrication of a head, if desired.

The cross members 19 at each end thereof extend beyond the two elongated lateral tine members 18a and constitute means for securing a head rigidly to an operating handle. As shown, each handle is of inverted U-shape and in the lower portions of the legs is provided with proper spaced or aligned apertures for receiving the end extensions of the tie rods 19 which at the outer extremities are shown provided with washers 20 and being up-set or riveted over at 21 to secure the head to the handle.

The handle members 12 and 13 may be formed of strap metal, such as of steel or aluminum, preferably the latter because of its lesser weight.

It will be noted that the handle member 12 has the legs 12a thereof spaced apart the same distance as the legs 13a of the handle member 13. Hence the tie rods 19 of each head can be of the same length. This equal spacing of the legs of the handle members requires that one leg of each handle section be disposed between the legs of the other section upper assembly and this in turn requires that the handle section be assembled in the relationship mentioned prior to the attachment of at least one of the heads to its respective handle section.

This inter-leaving relation of the equally spaced legs of the handle sections results in the lateral-off-setting of the tines of the identical heads with the result that the tines are likewise arranged in positions to inter-leave without clashing when the tool is moved to the fully closed position indicated by dotted lines in Fig. 1. When in said fully closed position, the lower portions of the tines of one head contact the lowermost tie rod 17 of the other head and thus limit further movement in the closing direction. It will be seen that although the two half sections of the tool are formed of corresponding parts which are identical, the assembly thereof effects the lateral off setting of the tines sufficiently to permit the lower ends of the tines of each head to inter-leave adequately in closing upon a relatively small quantity of loose material that is to be picked up. By reason of such assembly of the half-sections of the tine, the corresponding parts of the tool can be identical in shape and size and the manufacturer of the half sections in "rights" and "lefts" of different dimensions or spacings of parts is not required.

In the use of the tool the horizontal portions of the U-shaped handles 12 and 13 provide hand grips and are grasped and swung pivotally apart to open up the heads to the extent required to span or receive a pile of leaves, twigs or other refuse upon the ground or to grasp as large a portion thereof as is feasible if the pile is greater than the holding capacity of the tool. By swinging the handle members pivotally one toward the other the heads grasp the refuse with a tong-like or scissors action and enable the material to be lifted from the ground for deposit in a vehicle or receptacle as desired.

Preferably each half section is of such length that a person of average stature employing the tool can pick up material from the ground without excessive bending or stooping. In the present commercial form of the tool the hand grip portions are approximately 30 inches from the ground when its tool stands in upright position. This length may be varied as desired. Since the tines inter-leave substantially when in fully closed relation as indicated in Fig. 1, the tool can, in such relation, be employed as a rake for gathering together scattered portions of the material on the ground. Likewise when in fully closed position the tool can be stood in upright position thereby avoiding stooping to pick up the tool when use thereof is resumed.

By reason of the provision of the elongated tines 18a of the intermediate banks which extend upwardly between the lower portions of the respective handles 12 and 13, a rigid union is provided between the handles and the heads. As will be noted, the intermediate bank of tines 18a provide a substantial portion of the width of the respective head and being secured to the crossrods 17 that are common to all the tines as well as to the cross rods 19 that are anchored to the handles, rigidity of each head is attained as well as rigid connection of each head to the respective handle. Furthermore the extension of the heads upwardly between the handles for the purpose of securing the heads to the handles adds substantially to the material holding capacity of the tool.

Since the thickness of the strap material of which the handle sections are formed is less than the desired spacing between the tines 18, washers or spacing members 22 preferably are employed on the rivets 14 between the adjacent arms of the handle members to provide adequate lateral offsetting of one head with respect to the other to insure uniform spacing of the lower inter-leaving portions of the tines of one head between the corresponding portions of the tines of the other head as illustrated in Fig. 2.

Variations in dimensions and in other details of the specific structure illustrated may be resorted to without departure from the spirit of the invention or the scope of the appended claims.

I claim:

1. A tool of the class described comprising a pair of inverted U-shaped handle members the legs of which are equally spaced apart, a pair of grasping heads each comprising a plurality of similarly spaced apart parallel tines and cross members securing the tines together, the tines being arranged in two lateral banks and an intermediate bank, the tines of the intermediate bank having extensions projecting beyond the upper ends of the tines of the lateral banks and disposed between the spaced apart free ends of the arms of the respective handle members and transverse tie rods secured to the upward extensions of each head and secured at the ends thereof to the arms of the respective handle members for attaching the heads to the handle members, said U-shaped handle members being pivotally connected together with the arms thereof in inter-leaving relationship for effecting the offsetting of one head with respect to the other to enable the lower ends of the tines to move into inter-leaving relationship upon closure of the heads upon material to be picked up.

2. A pick-up tool for leaves or the like comprising a pair of handle members pivotally connected intermediate the upper and lower ends thereof, said handle members being of inverted U-shape with the free ends of the members lowermost, and a fabricated tine gathering head for each handle member comprising a plurality of spaced apart parallel tines and transverse tie members securing the tines in spaced apart parallel relation, certain of the intermediate tines of each head extending beyond the upper ends of the other tines and between the lower ends of the respective handle members and provided with transverse tie members attached at the ends thereof to the free ends of the handle member for securing the head to the handle member.

3. A pick-up tool of the class described comprising a pair of fabricated tine heads each provided with spaced apart parallel tines and transverse tie members securing the tines in said relation, a bank of the intermediate tines of each head being elongated and extending beyond the upper ends of the other tines, transverse tie members attached to the extensions of each head, and an inverted U-shaped handle member of strap material for each head having the free ends of the arms thereof extending downwardly and spaced apart for receiving therebelow the upward extensions of the intermediate bank of tines of the respective head, said transverse tie members of the extensions of each head being attached to the ends to the arms of the respective handle members for securing the corresponding heads thereto, said handle members being pivotally secured together intermediate the ends thereof whereby the upper ends of the handle members can be manipulated manually for moving the respective heads toward and away each from the other into grasping and releasing relation, respectively, with material being handled, the lower portions of the tines of each head being curved toward the other head and being respectively offset laterally from the tines of the other head to enable the tines to inter-leave freely upon movement of the heads fully into grasping relation.

4. A pick-up tool of the character described comprising a pair of inverted U-shaped handles pivotally connected together intermediate the upper and lower ends thereof for tong-like movement, and a head for each handle member formed of fabricated wire comprising a pair of end tines integral at the upper ends with a transverse connecting member, additional parallel transverse tie members welded to said tines, additional tines disposed between said end tines and welded to said transverse members at the points of intersection thereof, a group of tines intermediate said end tines being of greater length than the remaining tines and extending upwardly between the lower portions of the respective handle member, and transverse tie members welded to the upwardly extending portions of said intermediate group of tines and attached at the ends to said handle member for securing the head to the handle member.

ALLAN C. BUSSEY.

REFERENCES CITED

The following references are of record in the file of this patent:

UNITED STATES PATENTS

| Number | Name | Date |
|---|---|---|
| 71,167 | Hattabough | Nov. 19, 1867 |
| 1,138,371 | Flynn | May 4, 1915 |
| 1,160,282 | Harris et al. | Nov. 16, 1915 |
| 1,588,927 | Willis | June 15, 1926 |